United States Patent
Xie (10) Patent No.: US 10,721,196 B2
(45) Date of Patent: Jul. 21, 2020

(54) METHOD AND DEVICE FOR MESSAGE READING

(71) Applicant: Beijing Xiaomi Mobile Software Co., Ltd., Haidian District, Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 212 days.

(21) Appl. No.: 15/827,475

(22) Filed: Nov. 30, 2017

(65) Prior Publication Data

US 2018/0159809 A1    Jun. 7, 2018

(30) Foreign Application Priority Data

Dec. 1, 2016  (CN) .......................... 2016 1 1091371

(51) Int. Cl.
*H04L 12/58* (2006.01)
*H04M 1/725* (2006.01)
(Continued)

(52) U.S. Cl.
CPC ............ *H04L 51/12* (2013.01); *G06F 3/0488* (2013.01); *G06F 21/32* (2013.01);
(Continued)

(58) Field of Classification Search
CPC ....... H04L 51/12; H04L 51/046; H04L 51/24; G06F 3/0488; G06F 21/32; G06K 9/00087; H04M 1/67; H04M 1/72547; H04W 4/12

See application file for complete search history.

(56) References Cited

U.S. PATENT DOCUMENTS 9,355,298 B2 * 5/2016 Semba ............... G06K 9/00087
9,690,382 B1 * 6/2017 Moussette ............... G06F 3/167
(Continued)

FOREIGN PATENT DOCUMENTS

CN    104794382 A    7/2015
CN    104866750 A    8/2015
(Continued)

OTHER PUBLICATIONS

Chinese Office Action (including English translation) issued in corresponding CN Patent Application No. 201611091371.0, dated Dec. 11, 2018, 10 pages.
(Continued)

*Primary Examiner* — Ali S Abyaneh
*Assistant Examiner* — Shu Chun Gao
(74) *Attorney, Agent, or Firm* — Arch & Lake LLP (57) ABSTRACT

The present disclosure relates to a method and a device for message reading. The method includes: when there is a notification of unread message displayed on a terminal screen, obtaining a reading operation instruction, where the reading operation instruction includes a position at which a click on the terminal screen is taken place; when the position is located in a first preset area having a fingerprint recognition circuit, receiving fingerprint information on the terminal screen and recognizing fingerprint information received; and when the fingerprint information is determined to be legitimate, opening a reading interface corresponding to the notification of the unread message and displaying the unread message using the reading interface.

12 Claims, 9 Drawing Sheets

(51) Int. Cl.
    *G06F 21/32*    (2013.01)
    *H04M 1/67*    (2006.01)
    *G06F 3/0488*    (2013.01)
    *G06K 9/00*    (2006.01)
    *H04W 4/12*    (2009.01)
(52) U.S. Cl.
    CPC ........ *G06K 9/00087* (2013.01); *H04L 51/046*
    (2013.01); *H04L 51/24* (2013.01); *H04M 1/67*
    (2013.01); *H04M 1/72547* (2013.01); *H04W*
    *4/12* (2013.01)

(56) References Cited

U.S. PATENT DOCUMENTS

| | | | |
|---|---|---|---|
| 9,740,381 B1* | 8/2017 | Chaudhri | G06F 1/1626 |
| 9,846,830 B1* | 12/2017 | Hopkins, III | G06Q 40/08 |
| 9,910,524 B1* | 3/2018 | Wells | G06F 3/04883 |
| 2010/0225607 A1 | 9/2010 | Kim | |
| 2015/0074615 A1 | 3/2015 | Han | |
| 2016/0085329 A1 | 3/2016 | Yim et al. | |
| 2016/0299556 A1 | 10/2016 | Jueng | |
| 2017/0286660 A1* | 10/2017 | Li | G06F 21/32 |
| 2017/0337542 A1* | 11/2017 | Kim | G06Q 20/204 |
| 2018/0189894 A1* | 7/2018 | Hong | G06Q 50/01 |
| 2018/0241856 A1* | 8/2018 | Cho | G06Q 20/3227 |
| 2018/0275749 A1* | 9/2018 | Yoon | G02B 27/01 |
| 2019/0244395 A1* | 8/2019 | Hyun | G06T 7/90 |

FOREIGN PATENT DOCUMENTS

| | | | | |
|---|---|---|---|---|
| CN | 105260065 A | | 1/2016 | |
| CN | 105825114 A | | 8/2016 | |
| CN | 105843525 A | * | 8/2016 | ............. G06F 3/041 |
| CN | 105843525 A | | 8/2016 | |
| WO | WO-2017100997 A1 | * | 6/2017 | ............. G06F 3/041 |

OTHER PUBLICATIONS

Russian Office Action issued in corresponding RU Patent Application No. 2018111210, dated Feb. 8, 2019, 7 pages.
EP extended Search Report dated Mar. 1, 2018 for corresponding EP Application No. 17204982.7, 9 pages.
International Search Report and Written Opinion issued in corresponding International Application No. PCT/CN2016/111361, dated Sep. 7, 2017, 11 pages.
Second Office Action of Chinese Application No. 201611091371.0 dated Apr. 25, 2019 with English translation (11p).

* cited by examiner

METHOD AND DEVICE FOR MESSAGE READING

CROSS-REFERENCE TO RELATED APPLICATIONS

This application is based upon and claims priority to Chinese Patent Application No. 201611091371.0, filed with the State Intellectual Property Office of P. R. China on Dec. 1, 2016, the entire contents of which are incorporated herein by reference for all purposes.

TECHNICAL FIELD

The present disclosure relates to electronic device technology field, and more particularly, to a method and a device for message reading.

BACKGROUND

In order to facilitate users to carry out information transmission, most mobile phones may receive short messages in the form of text message or may receive text or voice messages by instant communication software in addition to having a function of voice call.

SUMMARY

The present disclosure provides a method and a device and a computer readable medium for message reading.

According to a first aspect of the present disclosure, a method for message reading is provided. The method may include when there is a notification of an unread message displayed on a terminal screen, obtaining a reading operation instruction where the reading operation instruction may include a position at which a click on the terminal screen is taken place; when the position is located in a first preset area having a fingerprint recognition circuit, receiving fingerprint information on the terminal screen and recognizing the fingerprint information received; and when the received fingerprint information is determined to be legitimate, opening a reading interface corresponding to the notification of the unread message and displaying the unread message using the reading interface.

According to a second aspect of the present disclosure, a device for message reading is provided. The device may include: a processor; memory for storing instructions executable by the processor; where the processor is configured to: when there is a notification of an unread message displayed on a terminal screen, obtain a reading operation instruction where the reading operation instruction may include a position at which a click on the terminal screen is taken place; when the position is located in a first preset area having a fingerprint recognition circuit, receive fingerprint information on the terminal screen and recognize the fingerprint information received; and when the fingerprint information is determined to be legitimate, open a reading interface corresponding to the notification of the unread message and display the unread message using the reading interface.

According to a third aspect of examples of the present disclosure, a non-transitory computer-readable storage medium is provided. The non-transitory computer-readable storage medium may store therein instructions and when the instructions are executed by a processor of a device, the instructions may cause the processor to perform: when there is a notification of an unread message displayed on a terminal screen, obtaining a reading operation instruction where the reading operation instruction may include a position at which a click on the terminal screen is taken place; when the position is located in a first preset area having a fingerprint recognition circuit, receiving fingerprint information on the terminal screen and recognizing fingerprint information received; and when the fingerprint information is determined to be legitimate, opening a reading interface corresponding to the notification of the unread message and displaying the unread message using the reading interface.

It is to be understood that both the foregoing general description and the following detailed description are exemplary and explanatory only and are not restrictive of the present disclosure.

BRIEF DESCRIPTION OF THE DRAWINGS

Accompanying drawings herein are incorporated in and constitute a part of the specification, and illustrate examples in line with the present disclosure, and serve to explain the principle of the present disclosure together with the description.

DETAILED DESCRIPTION

Reference will now be made in detail to examples, the examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

A term used in an example herein is merely for describing the example instead of limiting the present disclosure. A singular form "a" and "the" used in an example herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an example herein to describe various kinds of information, such information should not be limited to such a term. Such a term is merely for distinguishing information of the same type. For example, without departing from the scope of the examples herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of examples herein. However, those skilled in the art know that the technical solutions of examples herein may be carried out without one or more of the details; alternatively, another method, component, device, step, etc. may be adopted. Under other conditions, no detail of a known structure, method, device, implementation, material or operation may be shown or described to avoid obscuring aspects of examples herein.

The technical solutions provided in examples of the present disclosure are applied in a terminal. The terminal may be a mobile phone, a tablet PC, a smart watch or other devices with a screen lock function, which shall not be limited in examples of the present disclosure. Taking the mobile phone as an example, it is assumed that the mobile phone receives a message under a screen lock state, and a message notification is displayed on the screen. If a user wants to read the message, he or she may need to click the message notification first such that the mobile phone jumps to an unlock interface, and then inputs a password or a fingerprint in the unlock interface to unlock the mobile phone. The mobile phone then jumps to a reading interface corresponding to the message notification only after the mobile phone is unlocked. Thus, when the user uses the method above to read messages, there are many operation steps, the process is complicated, and the user experience is bad.

Figure 1A:
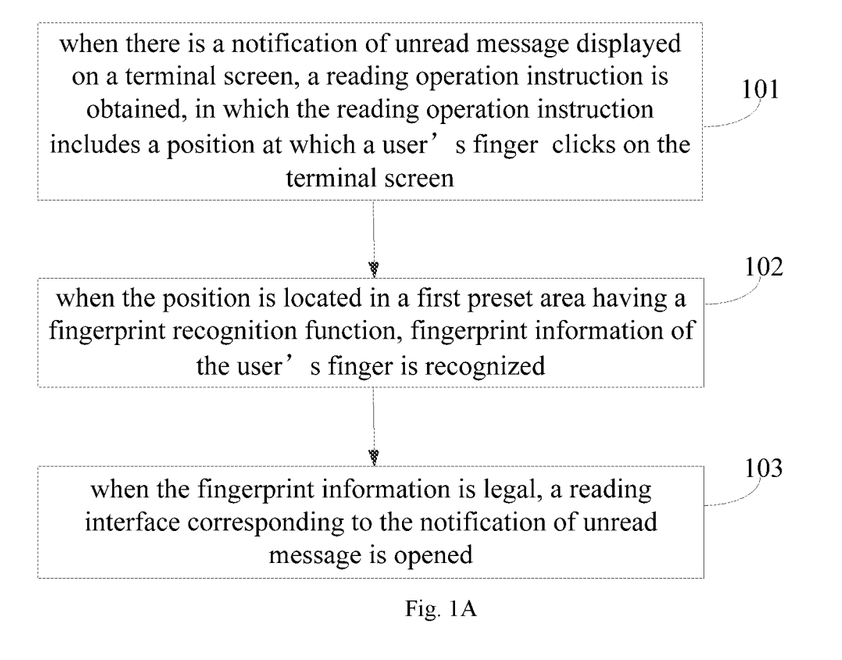
FIG. 1A is a flow chart of a method for message reading according to an example of the present disclosure.

FIG. 1A is a flow chart of a method for message reading according to an example of the present disclosure. The method for message reading is applied in a terminal. The terminal may be a mobile phone, a tablet PC, a smart watch or other devices with a screen lock function, which shall not be limited in examples of the present disclosure. As shown in FIG. 1A, the method for message reading may include following steps 101 to 103.

In step 101, when there is a notification of unread message displayed on a terminal screen, a reading operation instruction is obtained, in which the reading operation instruction includes a position at which a user's finger clicks on the terminal screen.

For example, when receiving a new message, the terminal may display a notification of unread message on the screen, so as to inform the user of reading the message in time. When the user needs to read the message, the user may click the notification of unread message displayed on the screen. When detecting that the user clicks on the screen, the terminal may obtain the position at which the user's finger clicks on the terminal screen, and then determine that the reading operation instruction input by the user is received.

In step 102, when the position is located in a first preset area having a fingerprint recognition circuit, fingerprint information of the user's finger is recognized.

For example, the first preset area having the fingerprint recognition circuit is set on the terminal screen. The first preset area may be a part of display area of the terminal screen, or entire display area of the terminal screen, which shall not be limited in the present disclosure.

When detecting that the user clicks the screen, the terminal firstly obtains the position at which the user's finger clicks on the screen, and then determines whether the position is located in the first preset area. When the position is located in the first preset area, fingerprint information of the user's finger is recognized by a fingerprint recognition device set in the first preset area.

In step 103, when the fingerprint information is verified and is determined to be legitimate, a reading interface corresponding to the notification of unread message is opened.

For example, in order to avoid unlocking the terminal in the situation of touching the screen by mistake, the terminal may pre-record and store fingerprint information for unlocking, namely pre-stored fingerprint information. If the fingerprint information obtained by the terminal matches the pre-stored fingerprint information, it indicates that the fingerprint information is legitimate, and the user wants to unlock the terminal and not touch the screen by mistake. In this case, the terminal is unlocked, and the reading interface corresponding to the notification of unread message is opened, so that it is easy for the user's reading. If the fingerprint information obtained by the terminal does not match the pre-stored fingerprint information, it indicates that the fingerprint information is not legitimate, and the current touch may be operated by mistake, and thus in this case, the terminal remains in the lock state.

"Match" means that the similarity between the fingerprint information obtained by the terminal and the pre-stored fingerprint information is greater than or equal to a preset threshold value. The preset threshold value may be 95% or 90%, which may be set according to specific situation in practical application, and shall not be limited in examples of the present disclosure.

In practice, the user may input fingerprints of certain fingers as the pre-stored fingerprint information according to instructions of the terminal. For example, when the terminal displays "please input fingerprint information of the index finger of the right hand" on the screen, the user may put the index finger of right hand in a finger recognition area. The terminal recognizes a fingerprint of the index finger of right hand and stores the fingerprint as the pre-stored fingerprint information.

In the technical solutions provided in examples of the present disclosure, when the user clicks the screen, the terminal may directly recognize the fingerprint of the user's finger by the fingerprint recognizing device set in the first preset area of the screen, and may open the reading interface corresponding to the notification of unread message when the fingerprint information is determined to be legitimate. This process does not need to jump to an unlock page, thereby simplifies operation steps for the user to read the unread message, and improves the user experience.

In an example, the first preset area having the fingerprint recognition circuit includes one or more second preset areas, and each of the one or more second preset areas is an area where each notification of unread message is located.

For example, when the terminal receives a lot of messages, there may be a plurality of notifications of unread messages displayed on the terminal screen. In order to avoid difficulties for the user to distinguish, the terminal may set a plurality of second preset areas in the first preset area. Each of the plurality of second preset areas is an area where each notification of unread message notification is located.

Figure 1B:
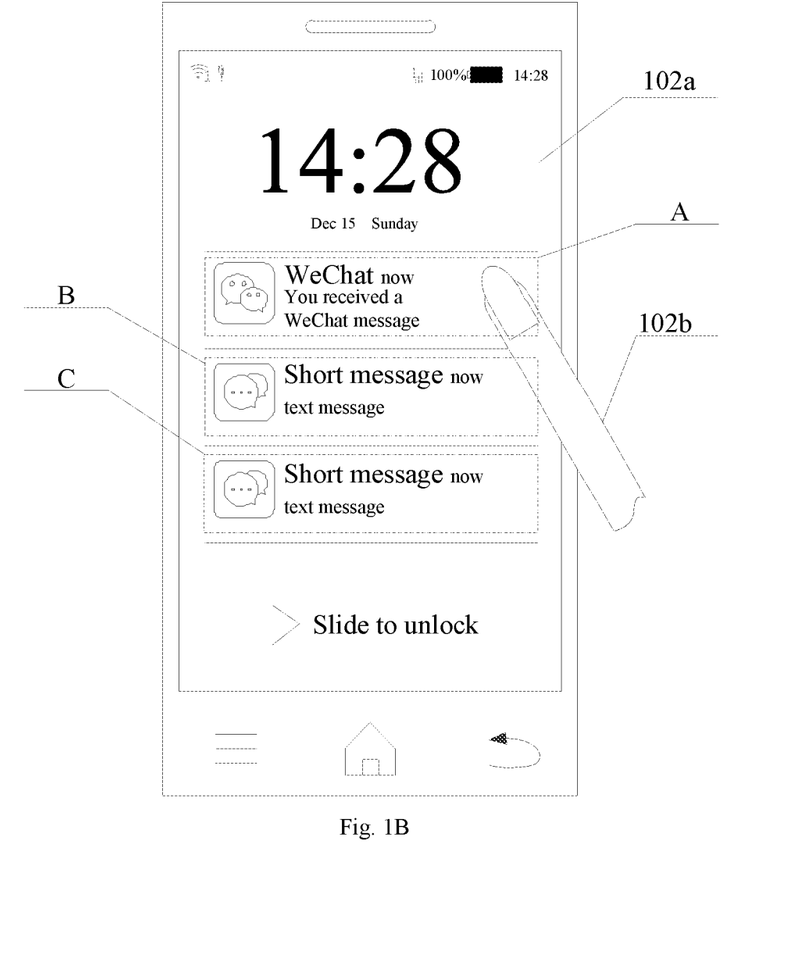
FIG. 1B is a schematic diagram showing an interface of a terminal according to an example of the present disclosure.

As shown in FIG. 1B, three notifications of unread message are displayed on the terminal screen 102a, which include a first notification of unread message, a second notification of unread message and a third notification of unread message. The first notification of unread message corresponds to a WeChat message and is set in a second preset area A. The WeChat message is a message that a terminal may receive via a mobile application named WeChat. The second notification of unread message and the third notification of unread message correspond to short messages and are set in a second preset area B and a second preset area C respectively. The short messages may be received by the terminal via a standard mobile application of a mobile terminal. If the user wants to read the unread message corresponding to the first notification, the user may click the second preset area A by using a finger 102b to tap the second preset area A.

In the technical solutions provided in examples of the present disclosure, one or more second preset areas are set in the first preset area of the terminal, and each of the one or more second preset areas is an area where each notification of unread message is located, such that notifications of different unread messages are set separately, and thus it is convenient for the user to distinguish, and user experience is improved.

Figure 1C:
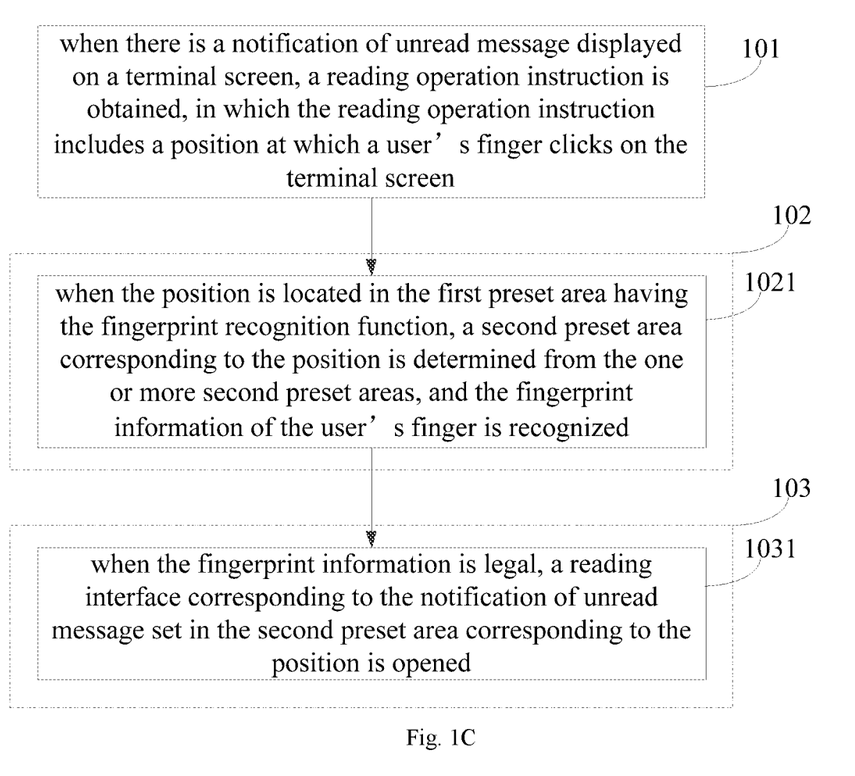
FIG. 1C is a flow chart of a method for message reading according to another example of the present disclosure.

In an example, as shown in FIG. 1C, in step 102, when the position is located in the first preset area having the fingerprint recognition circuit, recognizing fingerprint information of the user's finger may be implemented by step 1021.

In step 1021, when the position is located in the first preset area having the fingerprint recognition circuit, one second preset area corresponding to the position is determined from the one or more second preset areas, and the fingerprint information of the user's finger is recognized.

In step 103, when the fingerprint information is determined to be legitimate, opening a reading interface corresponding to the notification of unread message may be implemented by step 1031.

In step 1031, when the fingerprint information is legitimate, a reading interface of a notification of unread message set in the second preset area corresponding to the position is opened.

Figure 1D:
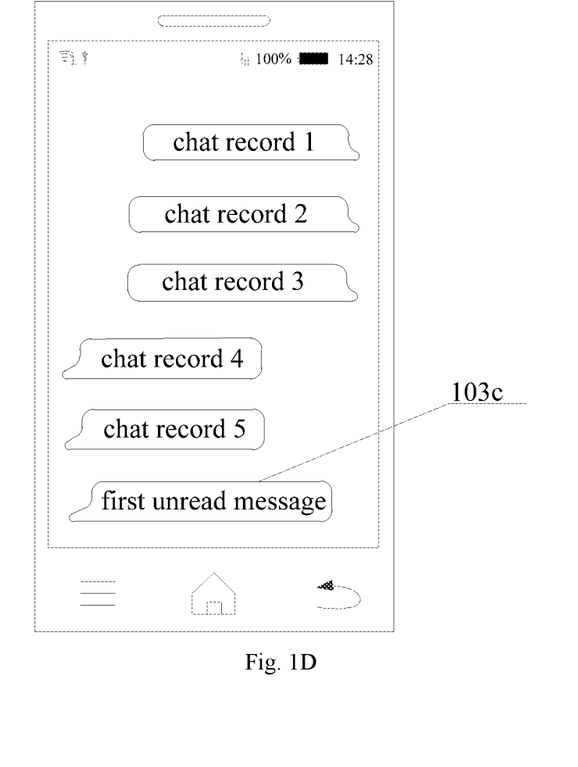
FIG. 1D is a schematic diagram showing an interface of a terminal according to another example of the present disclosure.

For example, as shown in FIG. 1B, after obtaining the position at which the user's finger 102b clicks on the screen, the terminal may determine the second preset area corresponding to the position at which the user's finger clicks on the screen, and may recognize the fingerprint information of the user's finger, and then determine whether the fingerprint is legitimate. If the fingerprint is legitimate, and the position is located in the second preset area A, which indicates that the first notification of unread message is clicked by the user. That is, the user wants to read the message indicated by the first notification of unread message. In this case, as shown in FIG. 1D, the terminal may jump to a reading interface corresponding to the first notification of unread message in WeChat, in which specific content 103c of the message indicated by the first notification of unread message is displayed. If the fingerprint is legitimate, and the position is located in the second preset area B or the second preset area C, the terminal jumps to a reading interface of short message.

In the technical solutions provided in examples of the present disclosure, the terminal may open reading interfaces corresponding to notifications of different unread messages according to different click positions of the user, which may improve the practicability of the terminal.

Figure 1E:
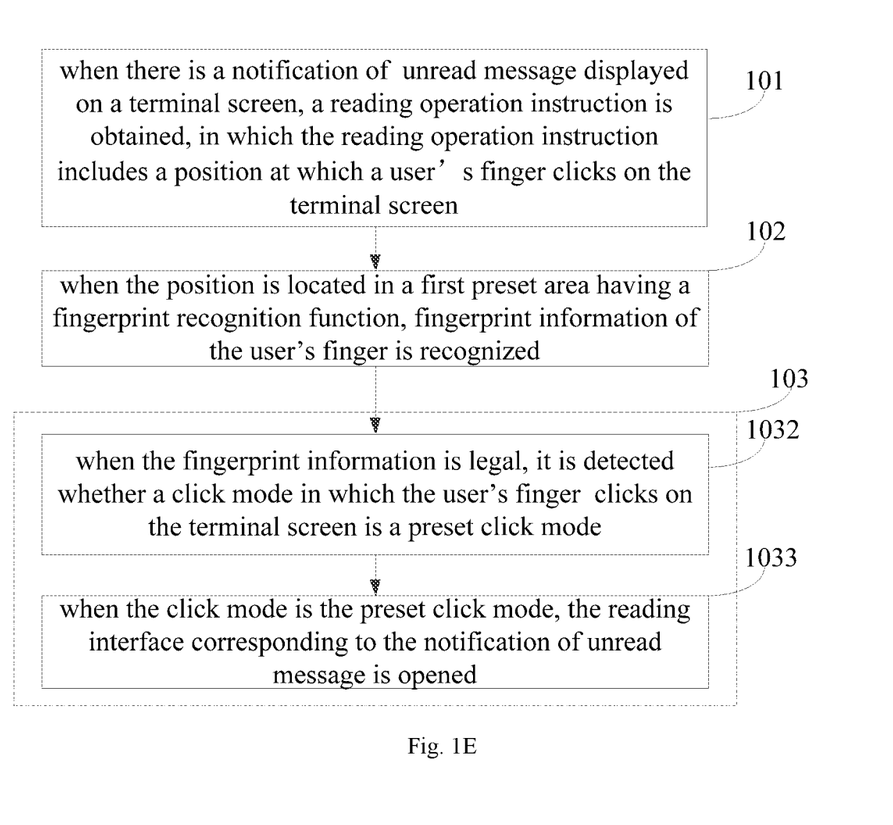
FIG. 1E is a flow chart of a method for message reading according to a further example of the present disclosure.

In an example, as shown in FIG. 1E, in step 103, when the fingerprint information is determined legitimate, opening the reading interface corresponding to the notification of unread message may be implemented by step 1032 and step 1033.

In step 1032, when the fingerprint information is legitimate, it is detected whether a click mode in which the user's finger clicks on the terminal screen is a preset click mode.

In step 1033, when the click mode for the click on the terminal is the preset click mode, the reading interface corresponding to the notification of unread message is opened. There may be multiple reading interfaces and each of the multiple reading interfaces may be associated with one notification of the unread message. One reading interface associated with the notification may be opened at one time. Also, more than one reading interfaces associated with multiple notifications may be opened at once. There may be other ways to open the reading interface and reading interfaces that are within the scope of the present disclosure and are not elaborated in detail herein.

For example, in order to avoid unlocking the terminal in the situation of touching by mistake, a click mode may be preset in the terminal during initialization of the terminal. When the terminal detects that the user clicks on the screen, the terminal may obtain the click mode in which the user clicks on the screen and the position at which the user's finger clicks on the screen. When the obtained fingerprint information is determined to be legitimate, it is determined whether the click mode is a preset click mode. If the click mode is the preset click mode, it indicates that the user wants to unlock the terminal right way, and the touch is not an accidental touch. In this case, the terminal can open the reading interface corresponding to the notification of unread message. If the click mode is not a preset click mode, it may indicate that the user may operate to click by mistake, and the terminal remains in the lock state.

For example, the preset click mode may be at least one of a single-click mode, a double-click mode and a long press mode, which may be set according to specific situation in practice, and shall not be limited in examples of the present disclosure.

In the technical solutions provided in examples of the present disclosure, when the terminal determines that the click mode in which the user's finger clicks on the terminal screen is matched with the preset click mode, the terminal opens the reading interface corresponding to the notification of unread message, thus avoiding the resource waste of the terminal caused by the fingerprint recognition when the user's finger touches the screen by mistake, and saving the power consumption of the terminal.

In an example, when the terminal opens the reading interface corresponding to the notification of unread message, the terminal may first determine whether the user's finger is of a preset finger type according to the fingerprint information. When the user's finger is of the preset finger type, the reading interface corresponding to the notification of unread message is opened.

For example, the preset finger type may be index finger or thumb, which may also be distinguished by left or right hand, such as index finger of the right hand, thumb of the right hand, index finger of the left hand, thumb of the left hand, which shall not be limited in example of the present disclosure.

During the process of the using the terminal, it is easy for the user's finger to touch the screen by mistake, and if each accidental touch triggers unlocking the mobile phone, incorrect operations may be caused, thus resulting in greater power consumption or communication resource waste of the terminal.

In order to avoid the above situation, when the terminal obtains the fingerprint information of the user, it can obtain the type of the user's finger according to the fingerprint information. When the user clicks on the screen by different fingers, contact areas between the finger and the screen, contact positions and relative positions of the center of the fingerprint relating to the screen are different. Different contact positions and contact areas may cause the lack of the overall fingerprint information to be recognized by the terminal. Also, different relative positions of the center of the fingerprint relating to the screen may cause a deviation of the center position in the obtained fingerprint information. Therefore, the terminal may determine the finger type of the user's finger clicking on the screen according to the all information of the obtained fingerprint and the center position of the fingerprint.

If the finger type of the user's finger matches the preset finger type, it indicates that the user wants to unlock the terminal right way, and the touch is not an accidental touch. In this case, the terminal is unlocked, and the reading interface corresponding to the notification of unread message is opened, so that it is easy for the user to read. If the finger type does not match the preset finger type, it indicates that the user may touch the screen by mistake, and the terminal remains in the lock state.

For example, if the preset finger type includes the index finger of the right hand and the index finger of the left hand, after the terminal obtains the fingerprint information, it determines whether the user's finger clicking on the screen is the index finger of the right hand or the index finger of the left hand according to the fingerprint information.

If the user's finger is the index finger of the right hand or the index finger of the left hand, it indicates that the user wants to read the unread message, and in this case, the terminal is unlocked, and the reading interface corresponding to the notification of unread message is opened, so that it is easy for the user to read. If the user's finger is neither the index finger of the right hand nor the index finger of the left hand, it indicates that other fingers of the user may touch the screen by mistake, and the terminal remains in the lock state.

In the technical solutions provided in examples of the present disclosure, after the terminal obtains the fingerprint information of the user's finger, it can determine whether the user's finger is of the preset finger type according to the fingerprint information, and the reading interface corresponding to the notification of unread message is opened when the user's finger is of the preset finger type, such that the situation of unlocking the terminal when the user's finger touches the screen by mistake is avoided, thus avoiding the incorrect operation of the terminal, and improving user experience.

Sometimes, unlocking the terminal screen and displaying the unread message may need separate validation processes. For example, when a notification of unread message shows on the screen of a terminal, a user may click the area where the notification displays. After that, the user's fingerprint is captured and validated and is determined to be legitimate. Then, a user interface is opened on the terminal screen to display the unread message. However, at this point, the terminal screen may be still in the lock mode. In order to unlock the terminal screen, the terminal screen may need the additional verification. For example, the user may need to press the terminal screen for more than a second to unlock the terminal screen. Alternatively, the user may need to press a delicate area of the terminal to unlock the terminal screen.

Sometimes, the two separate validation processes may be correlated and may be integrated. For example, when a user presses an area to display a notification of an unread message for less than one second, only the reading interface is opened on the terminal screen to display the unread message and the terminal screen is still locked. However, when the user presses the area to display a notification of the unread message for one second or longer, the reading interface is opened on the terminal screen to display the unread message, and also, the terminal screen is unlocked.

Sometimes, the methods other than the fingerprint may be used for authenticating the user. For example, the face recognition may be used for authenticating the user to unlock the screen. For example, when a user looks at a notification of an unread message for a period of time, more than 0.5 seconds for example, the user's facial characteristics may be captured by a camera and may be validated after comparing the captured facial characteristics to stored facial characteristics and determining that the user's facial characteristics are legitimate, then, the reading interface may be opened on the terminal screen to display the unread message.

Figure 2:
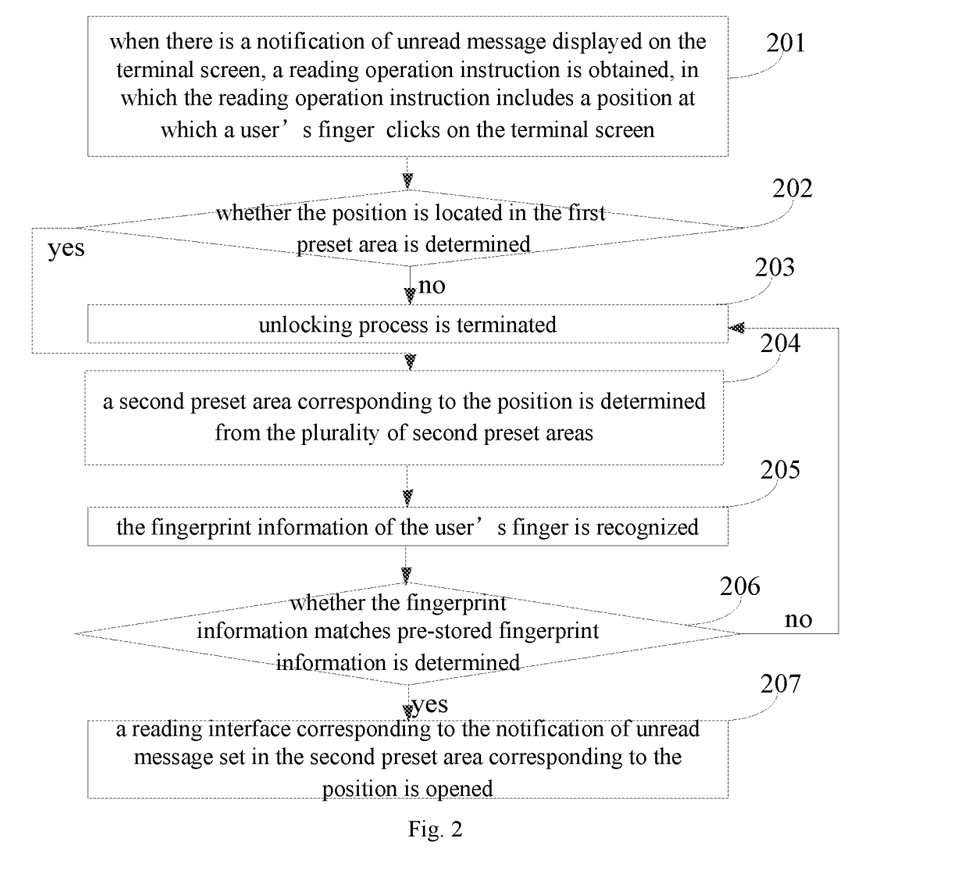
FIG. 2 is a flow chart of a method for message reading according to a second example of the present disclosure.

FIG. 2 is a flow chart of a method for message reading according to a second example of the present disclosure. The method may be applied in a terminal. There may be a fingerprint recognition device set in a first preset area of the screen of the terminal, and the first preset area may include a plurality of second preset areas. As shown in FIG. 2, the method includes following steps.

In step 201, when there is a notification of unread message displayed on the terminal screen, a reading operation instruction input by a user is obtained, in which the reading operation instruction includes a position at which a user's finger clicks on the terminal screen, and then step 202 is executed.

In step 202, whether the position is located in the first preset area is determined. If the position is not located in the first preset area, step 203 is executed, and if the position is located in the first preset area, step 204 is executed.

In step 203, unlocking process is terminated, and the process is over.

In step 204, a second preset area corresponding to the position is determined from the plurality of second preset areas, and step 205 is executed.

In step 205, the fingerprint information of the user's finger is recognized, and step 206 is executed.

In step 206, whether the fingerprint information matches pre-stored fingerprint information is determined. If the fingerprint information does not match the pre-stored fingerprint information, step 203 is executed, and if the fingerprint information matches the pre-stored fingerprint information, step 207 is executed.

In step 207, a reading interface corresponding to the notification of unread message set in the second preset area corresponding to the position is opened.

Examples of the present disclosure provide a method for message reading, with which, when the user clicks on the screen, the terminal may directly recognize the fingerprint of the user's finger by the fingerprint recognizing device set in the first preset area of the screen, and may open the reading interface corresponding to the notification of unread message when the fingerprint is determined to be legitimate.

Such process does not need to jump to an unlocking page, thus simplifies operation steps for the user to read the unread message, and improves the user experience.

Figure 3:
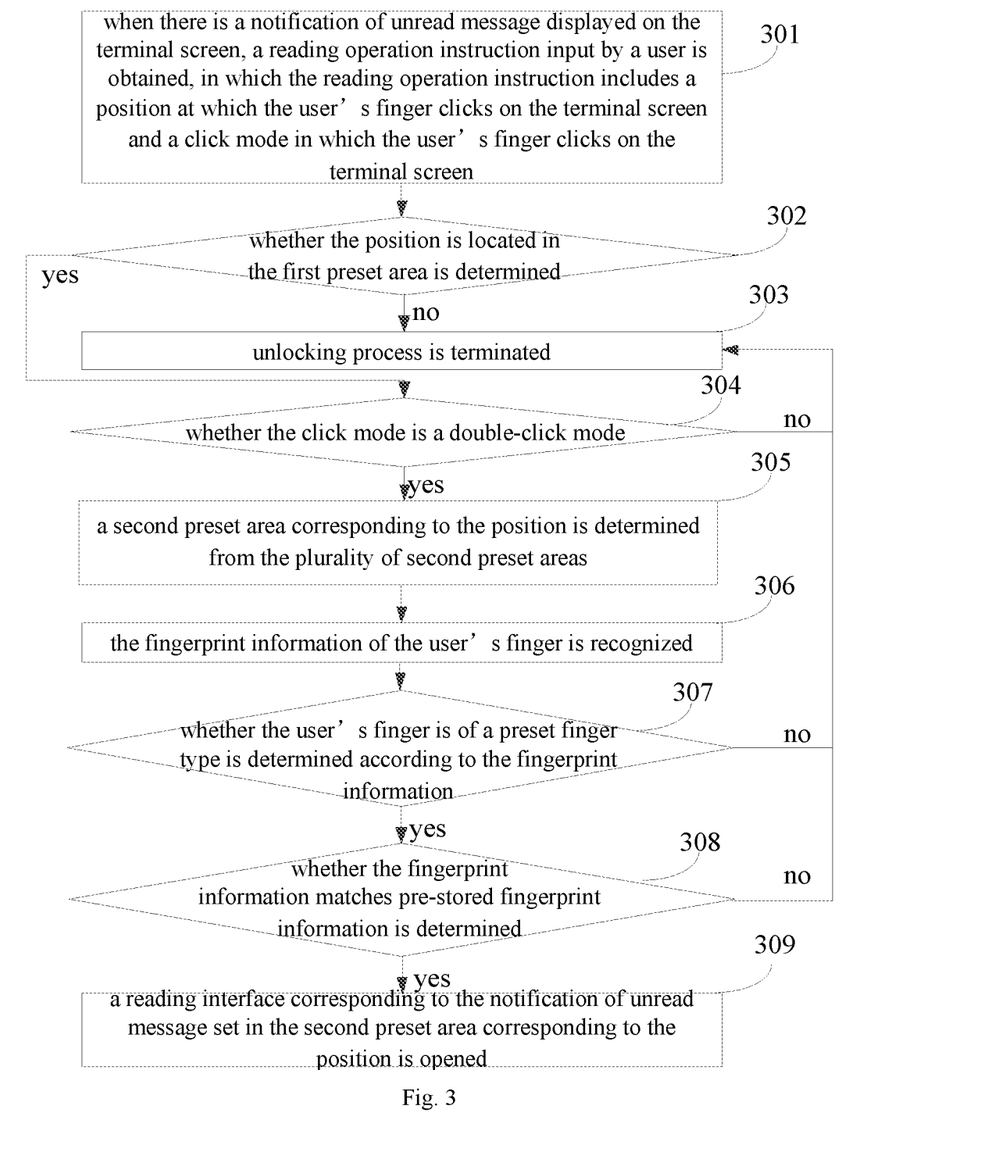
FIG. 3 is a flow chart of a method for message reading according to a third example of the present disclosure.

FIG. 3 is a flow chart of a method for message reading according to a third example of the present disclosure. The method may be applied in a terminal. There may be a fingerprint recognition device set in a first preset area of the screen of the terminal, and the first preset area may include a plurality of second preset areas. As shown in FIG. 3, the method includes following steps.

In step 301, when there is a notification of unread message displayed on the terminal screen, a reading operation instruction input by a user is obtained, in which the reading operation instruction includes a position at which a user's finger clicks on the terminal screen and a click mode in which the user's finger clicks on the terminal screen, and then step 302 is executed.

In step 302, whether the position is located in the first preset area is determined. If the position is not located in the first preset area, step 303 is executed, and if the position is located in the first preset area, step 304 is executed.

In step 303, unlocking process is terminated, and the process is over.

In step 304, whether the click mode for the click on the terminal screen is a double-click mode is determined. If the click mode is not the double-click mode, step 303 is executed, and if the click mode is the double-click mode, step 305 is executed.

In step 305, a second preset area corresponding to the position is determined from the plurality of second preset areas, and step 306 is executed.

In step 306, the fingerprint information of the user's finger is recognized, and step 307 is executed.

In step 307, whether the user's finger is of a preset finger type is determined according to the fingerprint information. If the user's finger is not of the preset finger type, step 303 is executed, and if the user's finger is of the preset finger type, step 308 is executed.

In step 308, whether the fingerprint information matches pre-stored fingerprint information is determined. If the fingerprint information does not match the pre-stored fingerprint information, step 303 is executed, and if the fingerprint information matches the pre-stored fingerprint information, step 309 is executed.

In step 309, a reading interface corresponding to the notification of unread message set in the second preset area corresponding to the position is opened.

Examples of the present disclosure provide a method for message reading, with which, when the user clicks on the screen, the terminal may directly recognize the fingerprint of the user's finger by the fingerprint recognizing device set in the first preset area of the screen, and may open the reading interface corresponding to the notification of unread message when the fingerprint is determined to be legitimate. Thus, this process does not need to jump to an unlocking page, thus simplifies operation steps for the user to read the unread message, and improves the user experience.

Followings are device examples of the present disclosure, which may be used to execute the method examples of the present disclosure.

Figure 4A:
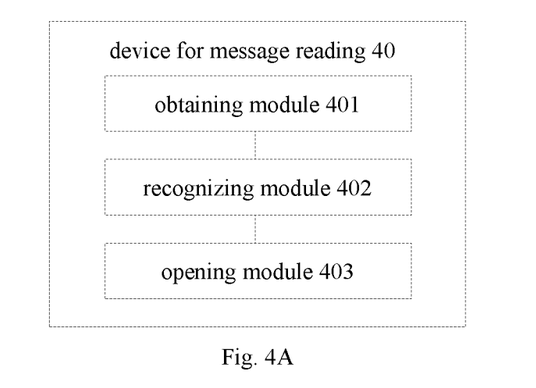
FIG. 4A is a block diagram of a device for message reading according to an example of the present disclosure.

FIG. 4A is a block diagram of a device 40 for message reading according to an example of the present disclosure. The device 40 may be realized as part or entire of an electronic apparatus by software, hardware or combinations thereof. As shown in FIG. 4A, the device 40 for message reading includes an obtaining module 401, a recognizing module 402 and an opening module 403.

The obtaining module 401 may be configured to obtain a reading operation instruction when there is a notification of unread message displayed on a terminal screen, in which the reading operation instruction includes a position at which a user's finger clicks on the terminal screen.

The recognizing module 402 may be configured to recognize fingerprint information of the user's finger when the position is located in a first preset area having a fingerprint recognition circuit.

The opening module 403 may be configured to open a reading interface corresponding to the notification of unread message when the fingerprint information is determined to be legitimate.

In an example, the first preset area having the fingerprint recognition circuit includes one or more second preset areas, and each of the one or more second preset areas is an area where there is one notification of unread message that is located in the area.

In an example, the recognizing module 402 may be configured to determine a second preset area corresponding to the position from the one or more second preset areas, and to recognize the fingerprint information of the user's finger, when the position is located in the first preset area having the fingerprint recognition circuit. The opening module 403 may be configured to open a reading interface corresponding to the notification of unread message set in the second preset area corresponding to the position, when the fingerprint information is determined to be legitimate. There may be multiple reading interfaces and each of the multiple reading interfaces may be associated with one notification of the unread message.

Figure 4B:
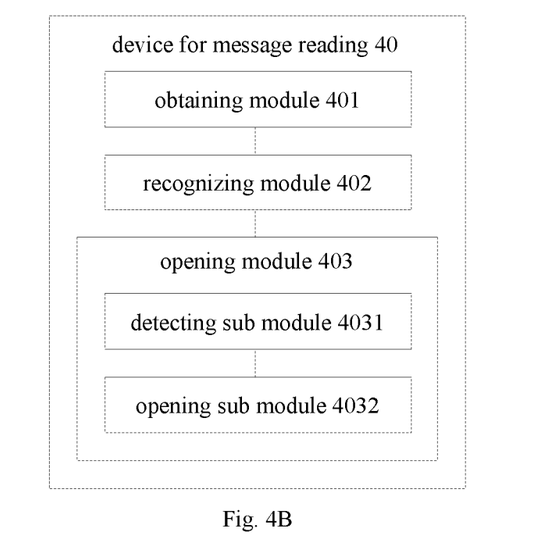
FIG. 4B is a block diagram of a device for message reading according to another example of the present disclosure.

In an example, as shown in FIG. 4B, the opening module 403 may include a detecting sub module 4031 and an opening sub module 4032.

The detecting sub module 4031 may be configured to detect whether a click mode in which the user's finger clicks on the terminal screen is a preset click mode when the fingerprint information is determined to be legitimate.

The opening sub module 4032 may be configured to open the reading interface corresponding to the notification of unread message when the click mode is the preset click mode.

In an example, the preset click mode includes at least one of a single-click mode, a double-click mode and a long press mode. The long press mode may be a mode that a user presses a first preset area for more than one second.

With the device for message reading provided by examples of the present disclosure, when the user clicks on the screen, the device may directly recognize the fingerprint of the user's finger by the fingerprint recognizing device set in the first preset area of the screen, and may open the reading interface of the notification of the unread message when the fingerprint is determined to be legitimate. Such process does not need to jump to an unlocking page, thus simplifies operation steps for the user to read the unread message, and improves the user experience.

A device for message reading is provided according to examples of the present disclosure. The device may include: a processor; a memory for storing instructions executable by the processor; wherein the processor may be configured to: when there is a notification of unread message displayed on a terminal screen, obtain a reading operation instruction, in which the reading operation instruction includes a position at which a user's finger clicks on the terminal screen; when the position is located in a first preset area having a fingerprint recognition circuit, recognize fingerprint information of the user's finger; and when the fingerprint information is legitimate, opening a reading interface corresponding to the notification of unread message.

In an example, the processor may also be configured as: the first preset area having the fingerprint recognition circuit includes one or more second preset areas, each of the one or more second preset areas is an area where one notification of unread message is located.

In an example, the processor may also be configured to: when the position is located in the first preset area having the fingerprint recognition circuit, determine a second preset area corresponding to the position from the one or more second preset areas, and recognize the fingerprint information of the user's finger; when the fingerprint information is legitimate, open a reading interface corresponding to the notification of unread message set in the second preset area corresponding to the position.

In an example, the processor may also be configured to: when the fingerprint information is determined to be legitimate, detect whether a click mode in which the user's finger clicks on the terminal screen is a preset click mode; when the click mode is the preset click mode, open the reading interface corresponding to the notification of unread message.

In an example, the processor may also be configured as: the preset click mode includes at least one of a single-click mode, a double-click mode and a long press mode.

With the device for message reading provided by examples of the present disclosure, when the user clicks on the screen, the device may directly recognize the fingerprint of the user's finger by the fingerprint recognizing device set in the first preset area of the screen, and may open the reading interface of the notification of the unread message when the fingerprint is legitimate. Thus, there is no need to jump to an unlocking page, and operation steps for the user to read the unread message are simplified, and the user experience is improved.

With respect to the device in the above examples, manners for respective modules performing operations may be described in detail in the method examples.

Figure 5:
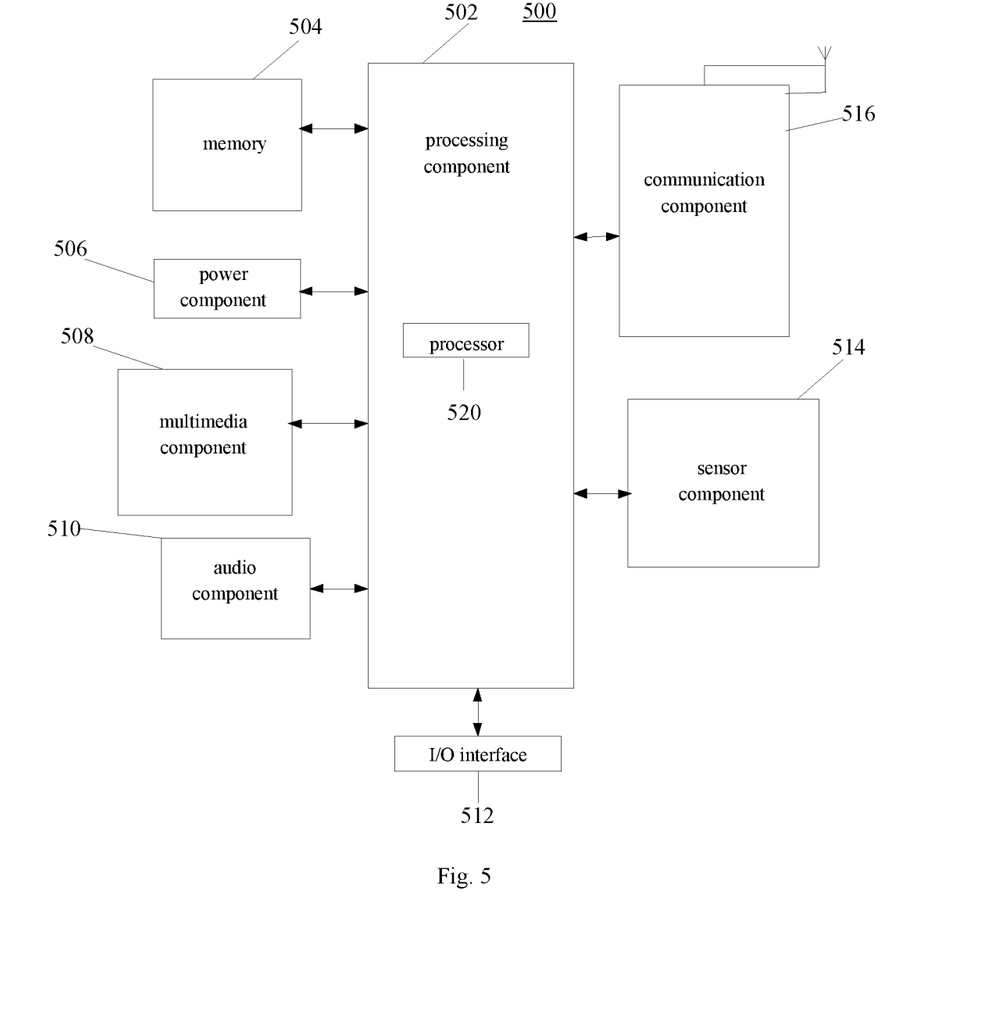
FIG. 5 is a schematic diagram showing a structure of a device for message reading according to an example of the present disclosure.

FIG. 5 is a block diagram showing a structure of a device 50 for message reading according to an example of the present disclosure. The device is suitable for terminal apparatus. For example, the device 50 may be a mobile phone, a computer, a digital broadcasting terminal, a messaging device, a game console, a tablet device, a medical device, fitness equipment, a Personal Digital Assistant PDA, and the like.

The device 50 may include the following one or more components: a processing component 502, a memory 504, a power component 506, a multimedia component 508, an audio component 510, an Input/Output (I/O) interface 512, a sensor component 514, and a communication component 516.

The processing component 502 typically controls overall operations of the electronic device 50, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 402 and other components. For instance, the processing component 502 may include a multimedia module to facilitate the interaction between the multimedia component 408 and the processing component 502.

The memory 504 may be configured to store various types of data to support the operation of the electronic device 50. Examples of such data include instructions for any applications or methods operated on the electronic device 50, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the electronic device 50. The power component 506 may include a power management system, one or more power sources, and any other components associated with the generation, management, and distribution of power in the electronic device 50.

The multimedia component 508 includes a screen providing an output interface between the electronic device 50 and the user, and the four corner of the screen are rounded. In some examples, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some examples, the multimedia component 508 includes a front camera and/or a rear camera. The front camera and/or the rear camera may receive external multimedia data while the electronic device 50 is in an operation mode, such as a photographing mode or a video mode. Each of the front camera and the rear camera may be a fixed optical lens system or have focus and optical zoom capability.

The audio component 510 may be configured to output and/or input audio signals. For example, the audio component 510 includes a microphone (MIC) configured to receive an external audio signal when the electronic device 50 is in an operation mode, such as a call mode, a recording mode, and a voice recognition mode. The received audio signal may be further stored in the memory 504 or transmitted via the communication component 516. In some examples, the audio component 510 further includes a speaker to output audio signals.

The I/O interface 512 provides an interface for the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the electronic device 50. For instance, the sensor component 514 may detect an open/closed status of the electronic device 50 and relative positioning of components (e.g. the display and the keypad of the electronic device 50. The sensor component 514 may also detect a change in position of the electronic device 50 or of a component in the electronic device 50, a presence or absence of user contact with the electronic device 50, an orientation or an acceleration/deceleration of the electronic device 50, and a change in temperature of the electronic device 50. The sensor component 514 may include a proximity sensor configured to detect the presence of nearby objects without any physical contact. The sensor component 514 may also include a light sensor, such as a CMOS or CCD image sensor, for use in imaging applications. In some examples, the sensor component 514 may also include an accelerometer sensor, a gyroscope sensor, a magnetic sensor, a pressure sensor, or a temperature sensor.

The communication component 516 may be configured to facilitate wired or wireless communication between the electronic device 50 and other devices. The electronic device 50 can access a wireless network based on a communication standard, such as WIFI, 2G, or 3G, or a combination thereof. In one example, the communication component 516 receives a broadcast signal or broadcast associated information from an external broadcast management system via a broadcast channel. In one example, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the electronic device 50 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer readable storage medium including instructions, such as the memory 504 including instructions. The instructions may be performed by the processor 520 of the electronic device 50 so as to realize the method for generating information. For example, the non-transitory computer-readable storage medium may be a ROM, a RAM, a CD-ROM, a magnetic tape, a floppy disc, an optical data storage device, and the like.

A non-transitory computer readable storage medium is provided. When instructions in the storage medium are performed by the processor of the device 50, the device 50 may be caused to execute a method for message reading, and the method includes: when there is a notification of unread message displayed on a terminal screen, obtaining a reading operation instruction, in which the reading operation instruction includes a position at which a user's finger clicks on the terminal screen; when the position is located in a first preset area having a fingerprint recognition circuit, recognizing fingerprint information of the user's finger; and when the fingerprint information is legitimate, opening a reading interface corresponding to the notification of unread message.

In an example, the first preset area having the fingerprint recognition circuit includes one or more second preset areas, and each of the one or more second preset areas is an area where each notification of an unread message is located.

In an example, when the position is located in the first preset area having the fingerprint recognition circuit, recognizing fingerprint information of the user's finger includes: when the position is located in the first preset area having the fingerprint recognition circuit, determining a second preset area corresponding to the position from the one or more second preset areas, and recognizing the fingerprint information of the user's finger; when the fingerprint information is legitimate, opening a reading interface corresponding to the notification of unread message includes: when the fingerprint information is legitimate, opening a reading interface corresponding to the notification of unread message set in the second preset area corresponding to the position.

In an example, when the fingerprint information is legitimate, opening a reading interface corresponding to the notification of unread message includes: when the fingerprint information is legitimate, detecting whether a click mode in which the user's finger clicks on the terminal screen is a preset click mode; when the click mode is the preset click mode, opening the reading interface corresponding to the notification of unread message.

In an example, the preset click mode includes at least one of a single-click mode, a double-click mode and a long press mode.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for message reading, comprising:
   when there is a notification of an unread message in a mobile application displayed on a terminal screen, obtaining a reading operation instruction wherein the reading operation instruction comprises a position at which a click on the terminal screen is taken place;
   when the position is located in a first preset area having a fingerprint recognition circuit, receiving fingerprint information on the terminal screen and recognizing the fingerprint information received, wherein the first preset area having the fingerprint recognition circuit comprises one or more second preset areas, and each of the one or more second preset areas is an area for displaying one notification of the unread message;
   when the received fingerprint information is determined to be legitimate, jumping to a reading interface in the mobile application corresponding to the notification of the unread message, the reading interface displaying the unread message;

when the position is located in the first preset area having the fingerprint recognition circuit, determining a second preset area corresponding to the position from the one or more second preset areas and recognizing the fingerprint information received; and when the fingerprint information is determined to be legitimate, jumping to the reading interface corresponding to the notification of the unread message set in the second preset area corresponding to the position.

2. The method according to claim 1, wherein jumping to the reading interface corresponding to the notification of the unread message comprises:

detecting whether a click mode for the click on the terminal screen is a preset click mode;

when the click mode is the preset click mode, jumping to the reading interface in the mobile application corresponding to the notification of the unread message.

3. The method according to claim 2, wherein the preset click mode comprises at least one of a single-click mode, a double-click mode and a long press mode.

4. The method according to claim 1, wherein jumping to the reading interface in the mobile application corresponding to the notification of the unread message comprises:

determining whether the received fingerprint information is associated with a preset finger type;

when the received fingerprint information is associated with a preset finger type, jumping to the reading interface in the mobile application corresponding to the notification of the unread message.

5. A device for message reading, comprising:
a processor;
a memory for storing instructions executable by the processor;
wherein the processor is configured to:

when there is a notification of an unread message in a mobile application displayed on a terminal screen, obtain a reading operation instruction, wherein the reading operation instruction comprises a position at which a click on the terminal screen is taken place;

when the position is located in a first preset area having a fingerprint recognition circuit, receive fingerprint information on the terminal screen and recognize the fingerprint information received, wherein the first preset area having the fingerprint recognition circuit comprises one or more second preset areas, and each of the one or more second preset areas is an area for displaying one notification of the unread message;

when the fingerprint information is determined to be legitimate, jump to a reading interface in the mobile application corresponding to the notification of the unread message, the reading interface displaying the unread message;

when the position is located in the first preset area having the fingerprint recognition circuit, determine a second preset area corresponding to the position from the one or more second preset areas and recognize the fingerprint information received; and when the fingerprint information is determined to be legitimate, jump to the reading interface corresponding to the notification of the unread message set in the second preset area corresponding to the position.

6. The device according to claim 5, wherein the processor is further configured to:

when the fingerprint information is determined to be legitimate, detect whether a click mode for the click on the terminal screen is a preset click mode;

when the click mode is the preset click mode, jump to the reading interface in the mobile application corresponding to the notification of the unread message.

7. The device according to claim 6, wherein the preset click mode comprises at least one of a single-click mode, a double-click mode and a long press mode.

8. The device according to claim 5, the processor is further configured to:

determine whether the received fingerprint information is associated with a preset finger type;

when the received fingerprint information is associated with the preset finger type, jump to the reading interface in the mobile application corresponding to the notification of the unread message.

9. A non-transitory computer-readable storage medium having stored therein instructions that, when executed by a processor, cause the processor to perform:

when there is a notification of an unread message in a mobile application displayed on a terminal screen, obtaining a reading operation instruction wherein the reading operation instruction comprises a position at which a click on the terminal screen is taken place;

when the position is located in a first preset area having a fingerprint recognition circuit, receiving fingerprint information on the terminal screen and recognizing the fingerprint information received, wherein the first preset area having the fingerprint recognition circuit comprises one or more second preset areas, and each of the one or more second preset areas is an area for displaying one notification of the unread message;

when the fingerprint information is determined to be legitimate, jumping to a reading interface in the mobile application corresponding to the notification of the unread message, the reading interface displaying the unread message;

when the position is located in the first preset area having the fingerprint recognition circuit, determining a second preset area corresponding to the position from the one or more second preset areas and recognizing the fingerprint information received; and when the fingerprint information is determined to be legitimate, jumping to the reading interface corresponding to the notification of the unread message set in the second preset area corresponding to the position.

10. The non-transitory computer-readable storage medium according to claim 9, wherein the instructions caused the processor to perform jumping to the reading interface corresponding to the notification of the unread message comprise the instructions to further cause the processor to perform:

detecting whether a click mode for the click on the terminal screen is a preset click mode;

when the click mode is the preset click mode, jumping to the reading interface in the mobile application corresponding to the notification of the unread message.

11. The non-transitory computer-readable storage medium according to claim 10, wherein the preset click mode comprises at least one of a single-click mode, a double-click mode and a long press mode.

12. The non-transitory computer-readable storage medium according to claim 9, wherein the instructions caused the processor to perform jumping to the reading interface in the mobile application corresponding to the notification of the unread message comprise the instructions to further cause the processor to perform:
  determining whether the received fingerprint information is associated with a preset finger type;
  when the received fingerprint information is associated with a preset finger type, jumping to the reading interface in the mobile application corresponding to the notification of the unread message.

* * * * *